United States Patent [19]

Bacardit

[11] Patent Number: 4,465,098

[45] Date of Patent: Aug. 14, 1984

[54] HYDRAULIC DISTRIBUTOR WITH A REACTION BIASED CONTROL MEMBER

[75] Inventor: Juan S. Bacardit, Barcelona, Spain

[73] Assignee: Bendiberica S.A., Barcelona, Spain

[21] Appl. No.: 403,231

[22] Filed: Jul. 29, 1982

[30] Foreign Application Priority Data

Aug. 4, 1981 [ES] Spain .................................... 505158

[51] Int. Cl.³ .............................................. F16K 11/02
[52] U.S. Cl. .................................. 137/625.21; 91/375 R
[58] Field of Search ........................ 137/625.21, 625.22, 137/625.23; 91/375 R, 375 A

[56] References Cited

U.S. PATENT DOCUMENTS

4,208,951  6/1980  Bacardit ............................ 91/375 R
4,217,932  8/1980  Bacardit ............................ 91/375 R

Primary Examiner—Alan Cohan
Attorney, Agent, or Firm—Larry J. Palguta; Paul D. Schoenle; Ken C. Decker

[57] ABSTRACT

The distributor, more particularly for power steering systems, includes two cooperating elements defining two parallel fluid flow circuits (10,11) each including three serially arranged restrictor means (1,2,3;1',2',3') actuable during relative displacement of said cooperating elements, and, for each circuit, in parallel with second restriction means (2;2') an external restriction means (EV;EV') controlled by external control means so as to selectively vary the position of the transition point between the first and second portions of the characteristic curve, assistance pressure delivered by the distributor/reaction on the input control member of the distributor (14).

8 Claims, 21 Drawing Figures

FIG_1

FIG_2

FIG_3

FIG_10

HYDRAULIC DISTRIBUTOR WITH A REACTION BIASED CONTROL MEMBER

The invention concerns hydraulic distributors and in particular, those used to control the operation of a power servomotor for assisting various mechanisms, for example the steering system of a vehicle, according to the position of an input control member, for example the steering wheel of said vehicle.

There are several types of distributors performing this function and which are based on the use of two cooperating elements which are displaceable one relative to the other, respectively linked to a control member reveiving the actuating force and to a controlled mechanism and defining therebetween an interface where there are openings and passages communicating with input and return motor fluid lines and with the two ends of the assistance servomotor, whereby relative displacement of said elements creates a modulable pressure differential between both ends of the servomotor.

There are known distributors of this type, in which the interface between the two elements is a cylindrical form with longitudinal grooves and cavities or in a disc or star-shaped form. In both cases, those distributors are designed to comprise at least one circuit establishing communication between a pressure fluid source and a return line or a reservoir, and including at least two serially arranged valve means which are simultaneously actuated by a control device, the output of a first of said valve means being connected to one end of an assistance hydraulic power motor controlled by a distributor, the output of a second of said valve means being connected to a hydraulic reaction device applying a reaction to the control unit, so as to define a pressure/torque characteristic with an initial portion of the curve corresponding to a practically nil pressure, and a following portion of the curve corresponding to an actuating assistance pressure approximately proportional to the torque (or force) applied to the input control member of the distributor.

In this way, in the particular case of a power steering mechanism, the driver receives information concerning the actuating force developed by the servomechanism. The distributor is generally designed in such a way that the reaction characteristic curve only begins after a certain given distance from a zero point or neutral position of the distributor, so as to make driving easier. However, experiments have shown that it is useful, given driving conditions, to vary the reaction characteristic position in the pressure/torque diagram, or in other words, to arrange the system so that reaction can begin at any desired distance from the neutral position.

This is the purpose of this invention, which provides a hydraulic distributor, more particularly for a vehicle power steering system, including two cooperating elements under action of an input control member and defining at least one modulable circuit establishing fluid communication between a pressure fluid source and a reservoir, this circuit including three serially arranged valve means simultaneously actuable during relative displacement between the two elements, the output of the first valve being connectable to one end of a hydraulic motor controlled by the distributor and the output of the second valve means being connectable to a hydraulic reaction system for applying a reaction to the control member and furnishing a characteristic curve actuating pressure of the hydraulic motor control torque applied to the control member having an initial portion of zero-slope and following a second portion with a given slope, a fourth modulable valve means in parallel with said second valve means and controlled by additional external control means so as to selectively modify the transition point position between said first and second portions of the characteristic curve.

It appears also useful to vary, for adaptation to different vehicle driving conditions, the slope of the second "proportional reaction" portion of the pressure/torque driving conditions. For this purpose, and according to another feature of the invention, a fifth valve means is located in series between the first valve means output and the second valve means input and actuated during relative displacement between the two distributor elements so as to determine the slope of a third terminal portion of the pressure/torque characteristic curve as from a determined value of the force applied to the distributor control device There are also known other types of distributors which provide such a third zone of predetermined slope of the pressure/torque characteristic curve, which is achieved for example, by resilient members of approximate dimensions, this being useful when the steering system is operated in limit conditions, in other words, in sharp curves, or under parking maneuver conditions. For the same reasons as above, in this case it is also useful to have the possibility of varying of the position of the third portion of the curve. Therefore, according to another feature of the invention, a sixth externally controlled external valve means is arranged in parallel with the third valve means of the distributor so as to modify the slope of the second portion of the distributor pressure/torque characteristic curve.

Obviously, the invention also includes the conjugated use of the above mentioned additional valve means which is separately actuated so as to simultaneously modify the different portions of any distributor characteristic curve as desired.

In a preferential embodiment of the invention, the hydraulic distributor is of the type where both cooperating elements are respectively composed of a star-shaped rotor located in a disc-shaped stator cavity, the rotor coupled to the control unit, the cooperating edges of recesses formed in the facing surfaces of the rotor and of the stator defining variable restrictions forming the first, second and third valve means, and is characterized in that the rotor includes reaction arms associated to discharge openings of the stator, each reaction arm separating two reaction chambers, each limited on the opposite side by an intermediate arm associated to an intermediate passage opening of the stator, the fourth external valve means being inserted in a circuit establishing communication between the reaction chamber and the adjacent intermediate passage opening.

In certain constructions of this type of distributors, the stator is received for limited rotational movement within a housing attached to the steering mechanism and is biased towards a central or neutral position by means of resilient members. In such a case, according to the invention, the stator has a radial protrusion movably between two stationary stop of the housing, and the resilient members comprise a C spring, the free ends of which are applied against the opposite sides of the stator protrusion and of a centering stop attached to the housing, the spring supplying the reaction for the third portion of the servocontrol actuator.

Other characteristics and advantages of the invention will be given in the following description of non-restrictive construction methods, in relation with the appended drawings, on which.

Figure 1:
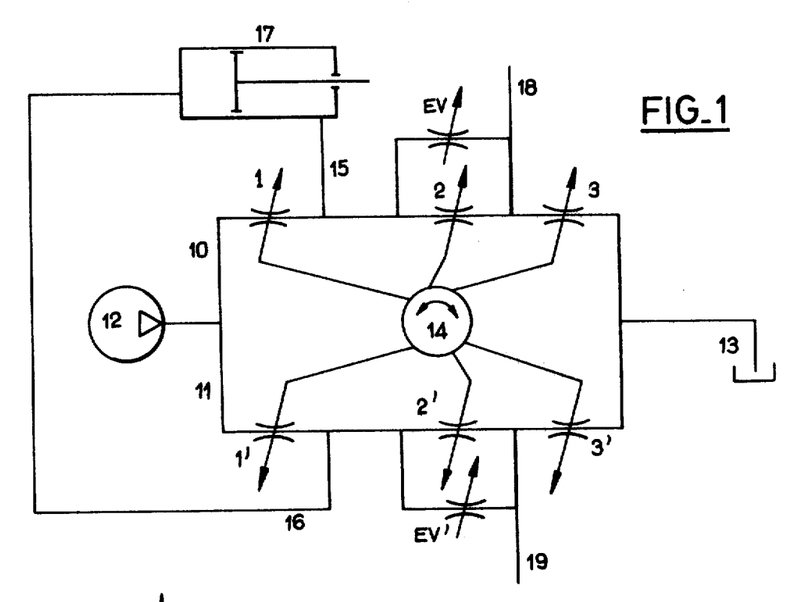
FIG. 1 is a symbolic diagram of a first power assistance system including a hydraulic distributor according to the invention.

FIG. 1 shows the diagram of a hydraulic distributor of the open center type which includes two circuits in parallel, 10 and 11 between a pressure fluid source 12 and a return line or reservoir 13, and each including three serially arranged valve means 1, 2, 3, and 1', 2', 3', repectively, which are simultaneously controlled by a single control member 14, to be described later. Branching between the valve means for restrictions 1, 2 and 1', 2' of each circuit, distribution conduits 15, 16 lead to the respective ends of a double action power actuator.

In parallel to the second restriction 2 and 2' are arranged four variable valve means or restrictions EV and EV', respectively in such a way that the through fluid flows thereof are added to those of the second restrictions 2 and to 2'. Branched between each pair of restrictions 2 and 3 (respectively 2' and 3'), conduits 18 and 19 lead to two hydraulic reaction devices, the purpose of which is to apply to the control member 14 a reaction proportional to the control force which is applied thereto.

To facilitate the explanation, we will consider that the distributor is part of an automobile power steering system and that it is composed of a star-shaped valve, as shown in FIGS. 3 to 7, of the type described in the European Patent Application No. 0,021,970 in the name of the applicant.

The star-shaped distributor valve of FIGS. 3 to 7 comprises a flat star-shaped rotor 20, centrally coupled to a triangular shaft 21 controlled by the steering wheel, and rotatingly received within a disc-shaped cavity of a stator conventionally composed of a central annular part 22 stacked between two side plates or discs 23 attached to the corresponding opposite axial sides of the central annular part. The stator assembly is mounted within a stationary housing 24 for limited rotation therein, as defined by the two facing surfaces of a radial window 25 of the stator within which is received with play a radial lug 26 of the stator. Rotor 20 includes reaction arms 27 of greater radius received in cavities of the stator (central part 22) so as to define in these cavities corresponding reaction chambers C and C' on both sides of each reaction arm. Various seals 28 are provided for tight hydraulic separation of the different functional chambers useful for valve operation, as shown more clearly on FIGS. 4 to 7.

Figure 3:
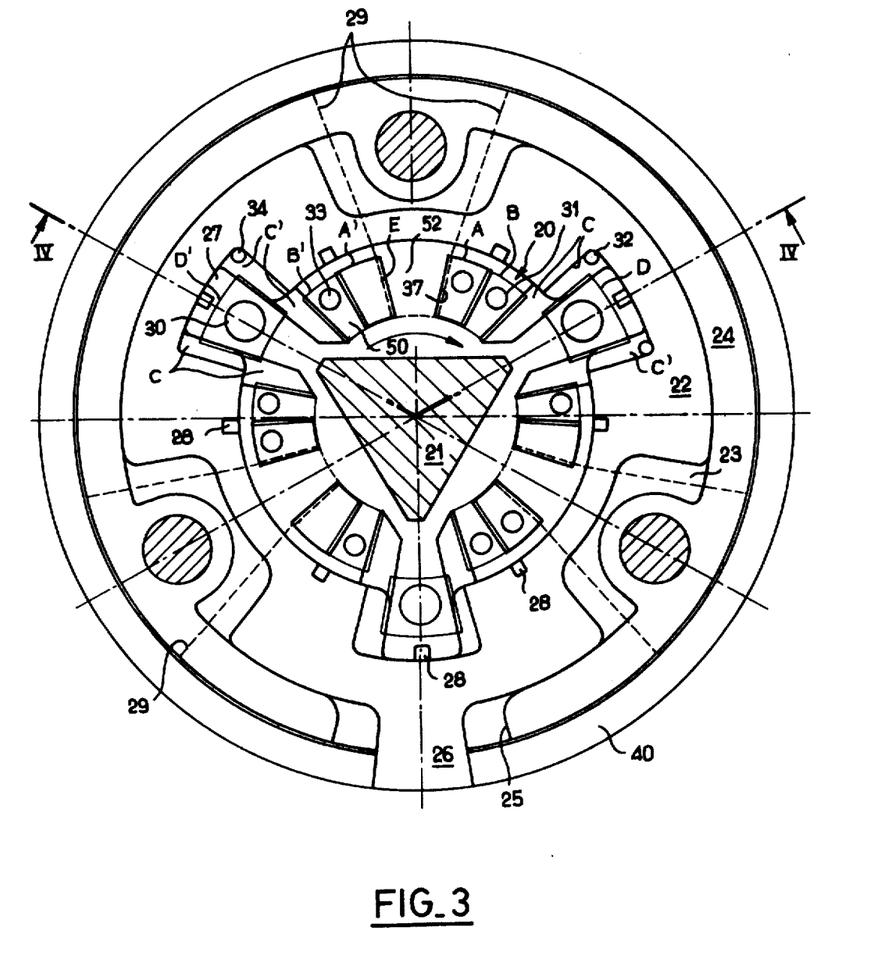
FIG. 3 shows a cross-section of a distributor with a star-shaped rotor, constructed according to the diagram in FIG. 1, in central rest position.
Figure 4:
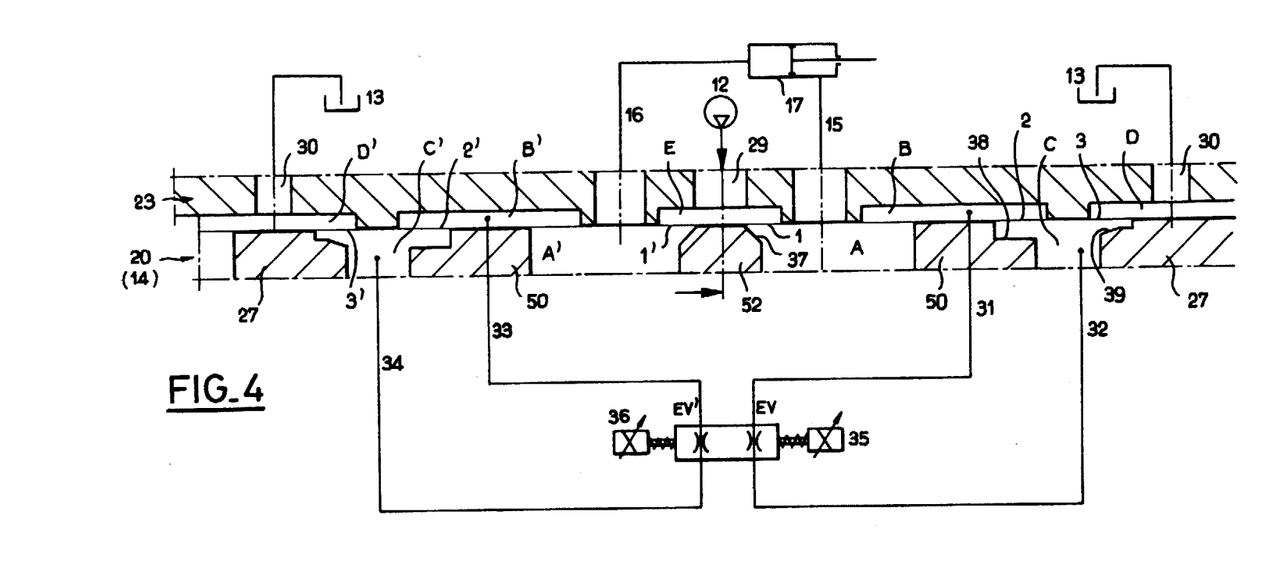
FIGS. 4, 5, 6 and 7 are diagrams developed according to cross section IV—IV of FIG. 3 and which correspond to different operating positions of the distributor.

As shown on FIGS. 3 and 4, an input opening E is recessed in the facing surfaces of the side plates 23 facing opposite sides of rotor 20, in a centered position between two adjacent reaction arms 27, so as to receive the fluid from pressure source 12 via a conduit 29. Similarly, two substantially identical intermediate openings B and B' are formed (recessed in the facing walls of plates 23, on both sides of each input opening E, as also, two identical additional discharge openings D and D' wherefrom extend return conduits 30 leading to reservoir 13. Cavities are formed in the rotor faces between arms of the rotor which also delimitates similarly chambers A and A' adjacent to the stator opening E and straddling openings E and B (E and B'), respectively, as also rotor chambers C and C' straddling openings B and D (respectively B' and D'), adjacent chambers A and C (or A' and C') being mutually separated by an intermediate arm 50 of the rotor. Conduits 31 and 32 lead respectively from opening B and chamber C to the opposite ends of the variable internal restriction EV, while similar conduits 33 and 34 lead from opening B' and chamber C' to the variable restriction EV'. In FIG. 4 both variable restrictions EV and EV' form a unit and are driven by solenoids 35 and 36', which are respectively controlled by electrical signals from an external control device (not shown).

FIG. 4 clearly shows how the valve means or restrictions 1-3 and 1'-3' described in FIG. 1 are formed between parts 20 and 23 (rotor and stator) of the star-shaped distributor. Starting from central input stator opening E, where the fluid under pressure arrives through conduit 29, which opening faces a short input arm 52 of the rotor), and progressing towards the right, in other words in the fluid circulation direction of this side of the valve, there is first the first restriction 1 formed by square edge of opening E and the chamfered edge 37 of the radial adjacent edge of the chamber A of the rotor. In rotor chamber C, the left-hand stepped edge 38 forms with the adjacent edge of opening B of stator 23 the restriction 2, and the right hand ramp-shaped edge 39 forms with the adjacent edge of stator exhaust opening D the restriction 3. The other not-mentioned edges do not form there control restrictions and have no effect on system operation in this direction. On the left of input opening E, the relative arrangement of the cooperating edges is symmetrical to that which have just been described, so that the assembly forms the two parallel circuits 10 and 11 described above.

This arrangement is clearly shown on FIG. 3, where there are for example three groups of valve means of the same type arranged angularly around the periphery of the star-shaped distributor.

The described distributor enables external modulation of the central operating point as will be shown; it offers a maximum reaction which is practically constant in the maximum input torque operating zone (FIG. 2) supplied by a C-spring 40 located around the valve, the ends of which are applied with a predetermined load against the opposite sides of lug 26 of the stator 22, and, at the same time, against a centering stop (not shown) placed axially immediately behind the above lug and which makes part of the stator housing. Assuming that the two variable external restriction EV and EV' produce a given constant restriction in their rest condition position, and that their electromagnetic control means 35 and 36 are maintained in a de-energized condition, the distributor operation is illustrated by curve 0-1-2-3 of FIG. 2 diagram which shows the relationship between effective pressure applied to the power servocontrol mechanism 17 as a function of the input torque, and where there are three operating zones, namely: initial position corresponding to straight line driving, represented by portion 0-1 of the characteristic curve; driving position, corresponding to normal driving in slight curves, represented by portion 1-2; and maneuvering position represented by portion 2-3, corresponding to driving in very sharp curves or during parking maneuvers. The rest position is defined by point 0 of the characteristic curve and is called central position.

In this central position 0 (illustrated on FIG. 4), a fluid pressure from pump 12 is proportionally distributed on both sides of the input (opening E) and passes through restrictions 1, 2 and 3 (and EV, in parallel with 2) in one direction, and restrictions 1', 2' and 3' (and EV', in parallel with 2') in opposite direction, in other words to the right or to the left of FIG. 4. The pressure of the circulating fluid is applied equally on both sides of each reaction branch 27, whereby there is no reaction torque applied.

Figure 5:
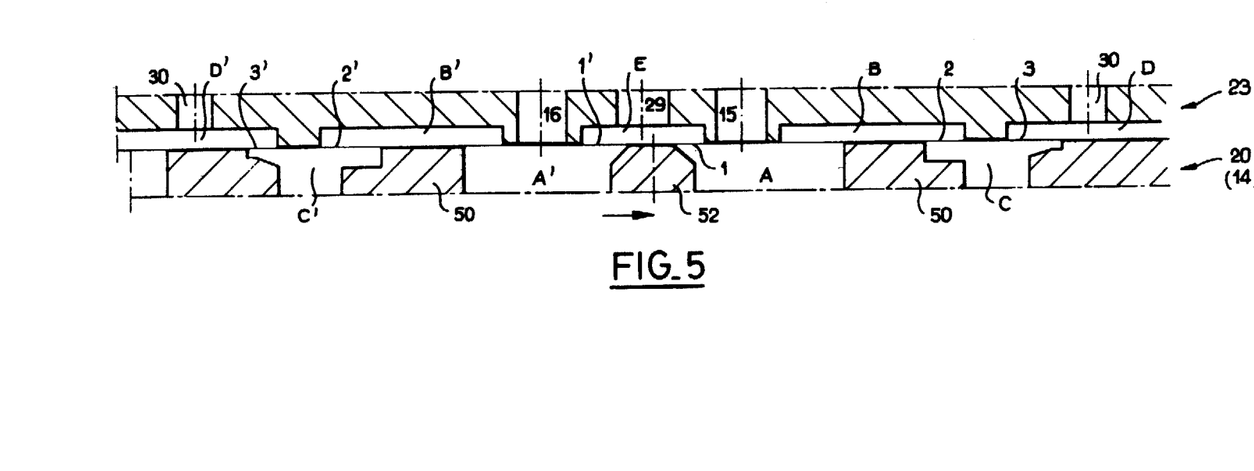
Figure 6:
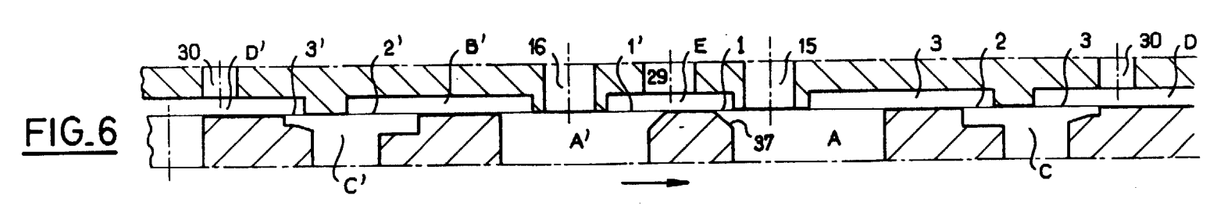

When the steering wheel is moved, rotor 20 is rotated with respect to the stator, for example in the direction of arrows on FIGS. 4 and 5. When, as shown in FIG. 5, rotor 20 leaves the rest position, restrictions 3' and 2 and EV become active so as to maintain equal pressure in chambers A and A', so as that there is no assistance furnished by actuator 17. However, the pressure in chamber C' increases as compared to that in chamber C. In other words, the different reaction arms separating the above-mentioned chambers are subjected to a higher fluid pressure on their faces oriented in the clockwise direction (in relation to FIG. 5) and therefore an anti-clockwise hydraulic reaction is produced on said arms which is transmitted to the steering wheel by rotor 20 and shaft 21. This operation phase is defined on FIG. 2 by portion 0-1.

Figure 2:
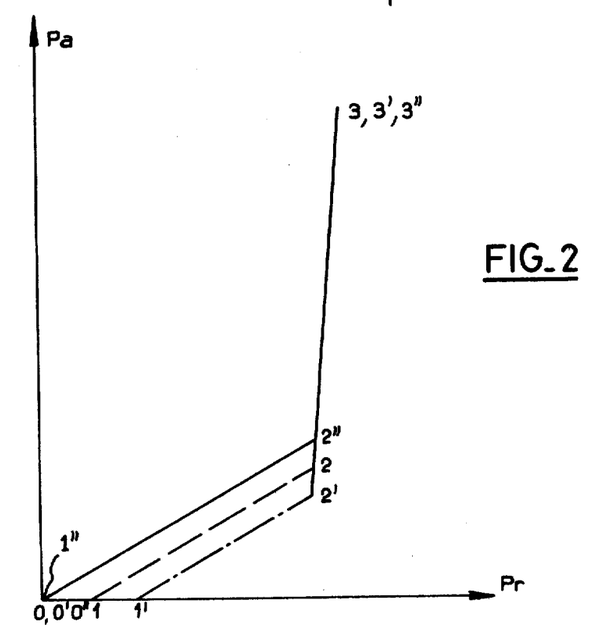
FIG. 2 is the diagram of the characteristic curve output power actuating distributor pressure versus drive control torque applied to the distributor.
Figure 7:
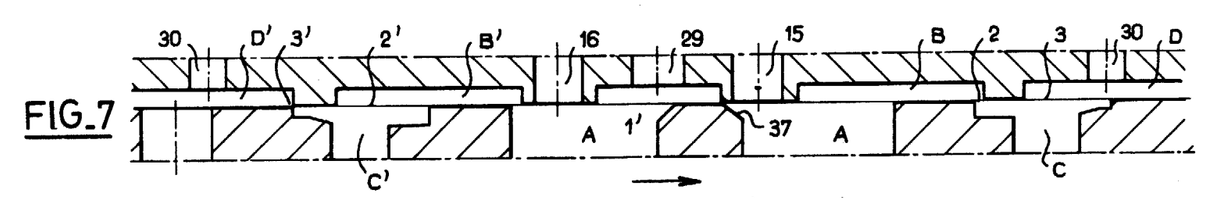
Figure 8:
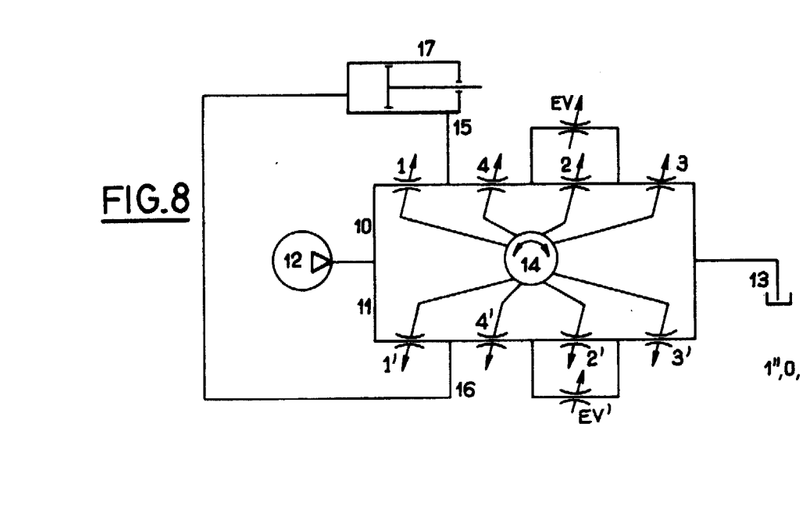
FIG. 8 is a diagram, similar to FIG. 1, of an alternative embodiment of the invention.

By continuing the steering wheel rotation, chamfer 37 comes closed to the adjacent lateral edge of opening E (FIG. 6), so that restriction 1 also becomes active or operant. Under these conditions, the pressure begins to increase in the area between restrictions 1 and 3' (on the left input opening E), said pressure being transmitted by conduit 16 to the left side of actuator 17, so that the latter is actuated in the same way. Since this pressure increase also exists in chamber C', an increasing reaction Pr, directly proportional to the power assisting pressure Pa, acts on each reaction arm 27. The increase of control torque displaces the operation point of the system along portion 1-2 of the characteristic curve. When reaching point 2, the reaction arms 27 come into abutment against the stator end of chambers C' wherein they are displaced (FIG. 7). From this moment on, spring 40 is actuated, since the lug 26 of the stator 22 begins to drive the corresponding branch end of the springs; in other words the torque value in position 2 is determined by the spring load, and the increase of the torque under these conditions occurs in relation to the elasticity of the spring.

The above-described operation corresponds in practice to the actuation of a distributor valve without external modulation when considering restrictions 3 and EV constant). If, on the contrary, solenoid 35, which controls restriction EV, is actuated to increase the value of the restriction passage section in EV, under the same operating conditions, the total pressure resulting of the sum of 3 and EV is less, and the reaction area of the central point will be more restricted than before. Consequently, when the value of the fluid passage section of EV increases, curve 0-1-2-3- tends towards curve 0"-1"-2"-3". On the contrary, if the value of the fluid passage section in Ev is reduced, there is displacement of the characteristic towards curve 0'-1'-2'-3', whereby resulting in a widening of the central reaction area.

Solenoids 35 and 36 can be controlled by any adequate conventional means, such as responsive to vehicle operating conditions, for example by an in-board processor which controls the vehicle running functions in relation to given driving or running circumstances or parameters.

Figure 11:
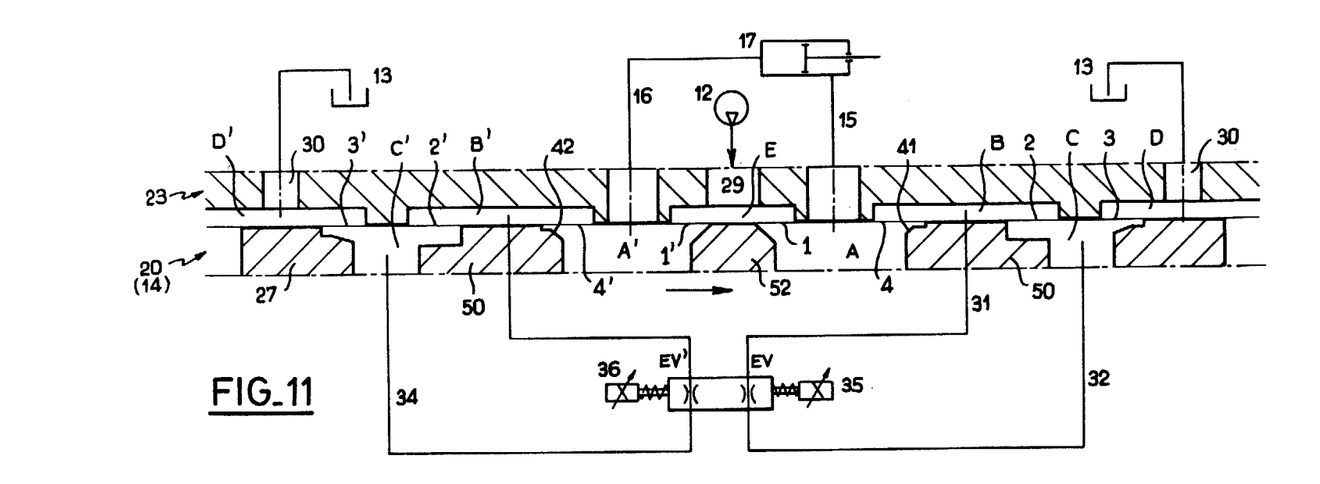
FIGS. 11 to 15 are diagrams developed according to cross-section XI—XI of FIG. 10 corresponding to various operating positions of the distributor of FIG. 10.
Figure 12:
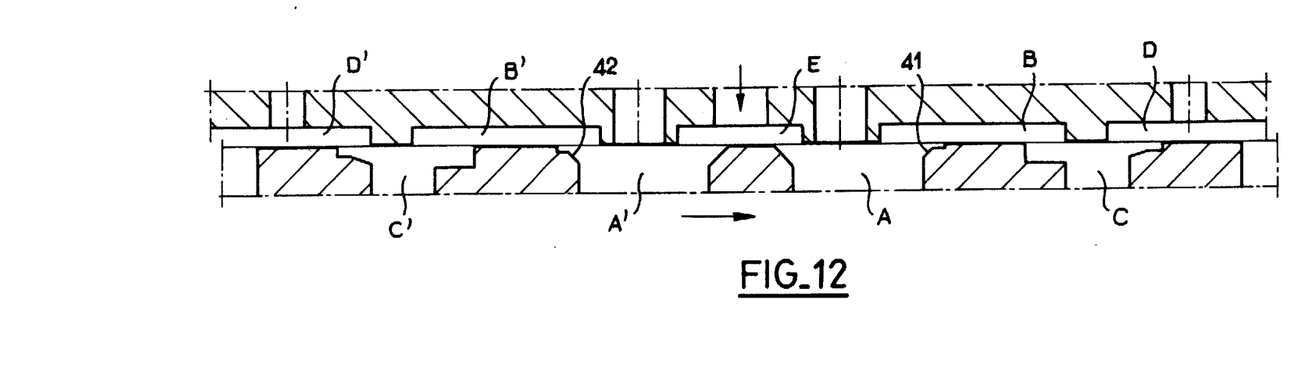

FIGS. 8 to 15 show another embodiment of the invention. Here spring C 40 is suppressed and the reaction corresponding to the third portion 2-3 of the characteristic curve is controlled by an additional restriction 4-4', located between restrictions 1 and 2 (respectively 1' and 2') of the circuit of FIG. 1 and defined by chamfers 41 and 42 at the level of the separation between chamber A and cavity B on one hand (A' and B' on the other hand), as shown in FIG. 11 (the remaining integers of the distributor remaining identical to these of the preceding embodiment).

Figure 13:
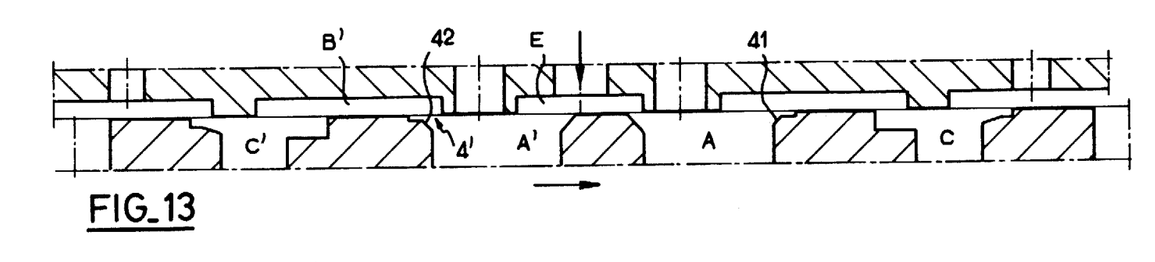
Figure 14:
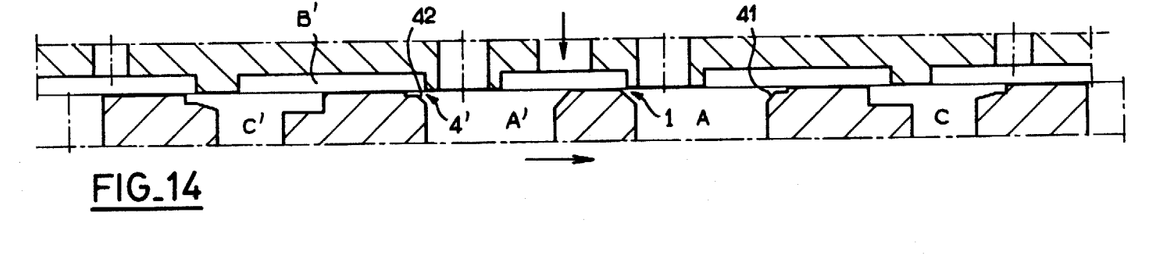
Figure 15:
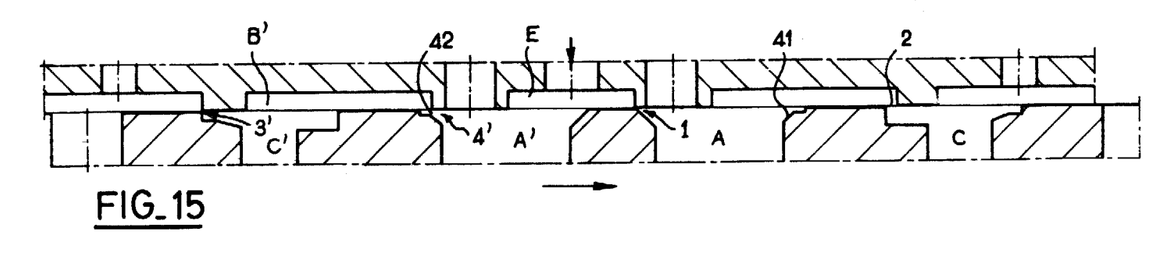

Operation in this case (FIG. 9) is identical to that which precedes, as concerns the initial and driving areas (FIGS. 11 and 12); at a given moment of the driving area 1-2 (point 2), chamfer 42, however, comes sufficiently close to the adjacent edge of stator opening B' to enter into action, so that from this moment on, the assistance power pressure and the reaction pressure (or torque) are differentiated by the pressure drop which occurs in the thus formed restriction 4'. For this purpose, the chamfer 42 (41) is dimensioned such that the pressure in chamber C' only slightly increases, so as to stabilize system operation, while the pressure in chamber A' continues to increase, as also, simultaneously the assistance pressure in the actuator (FIGS. 13 and 14). When reaching position 3, maximum operating pressure of the system is attained: restrictions 1 and 3' completely close while restrictions 2 and 4' (as well as EV) are held partially open to retain system stability until the mechanical stop is reached.

Figure 9:
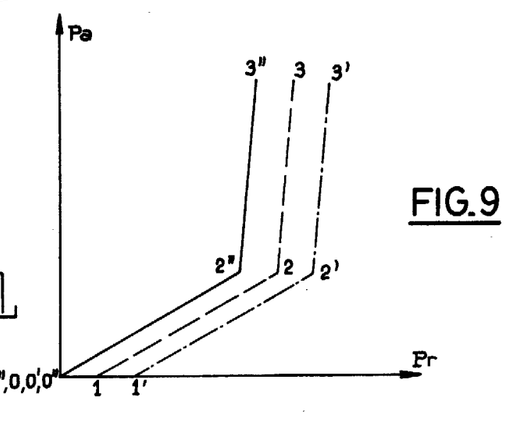
FIG. 9 is the diagram of pressure/torque characteristic curves obtained during operation of the corresponding distributor.
Figure 10:
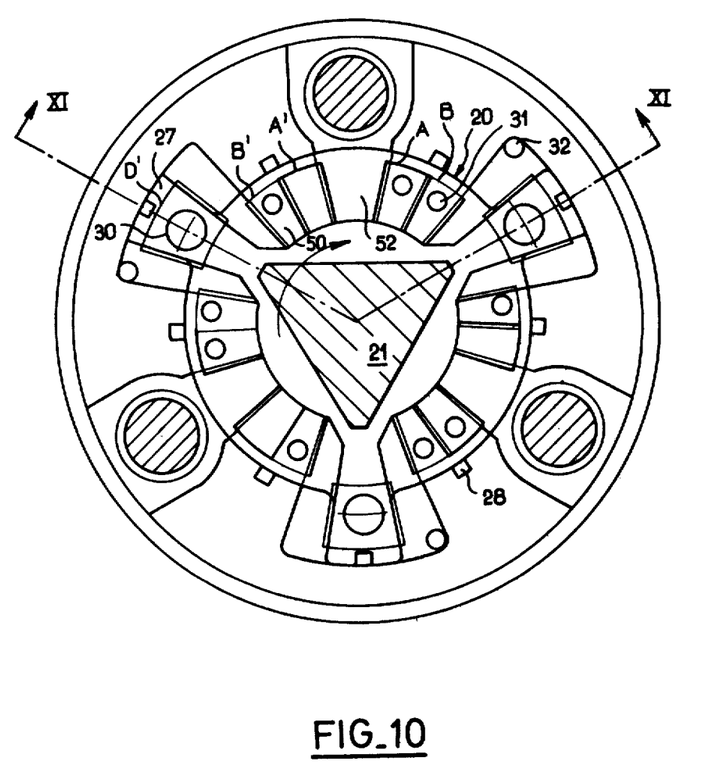
FIG. 10 is the equivalent of FIG. 3 and shows the arrangement of a star-shaped valve according to the diagram of FIG. 8.

In the same way as in the arrangement of FIG. 1, control of modulable external restrictions EV and EV' enables the distributor characteristic to be shifted which, in this case, adopts the forms shown in FIG. 9 which requires no additional explanation.

Figure 16:
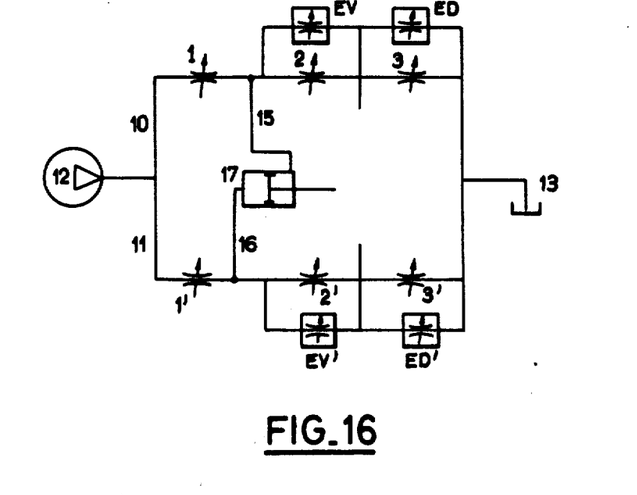
FIG. 16 is a schematic diagram of another alternative embodiment of a distributor according to the invention.

Other variants are possible according to the same principles. For example, as shown on FIG. 16, other external restrictions ED and ED' can be inserted in parallel with third (downstream) restrictions 3 and 3' of FIG. 1, and they can be arranged so that they can be controlled as previously described.

Figure 17:
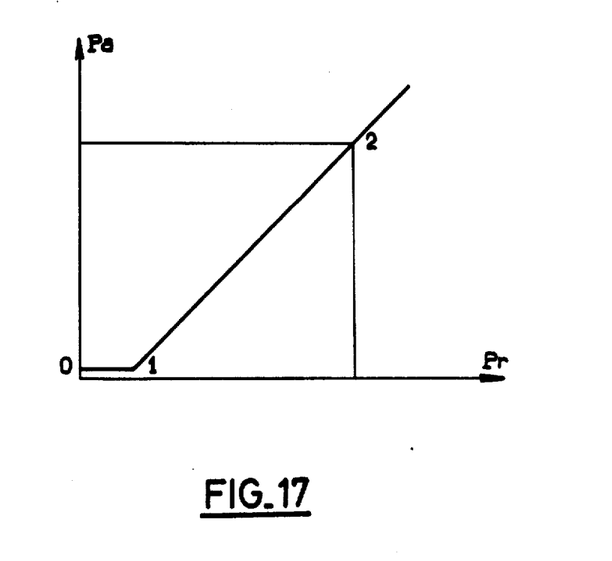
FIGS. 17 to 21 show various diagrams of pressure/torque characteristic curves which can be obtained with the distributor arrangement according to the diagram of FIG. 16.
Figure 18:
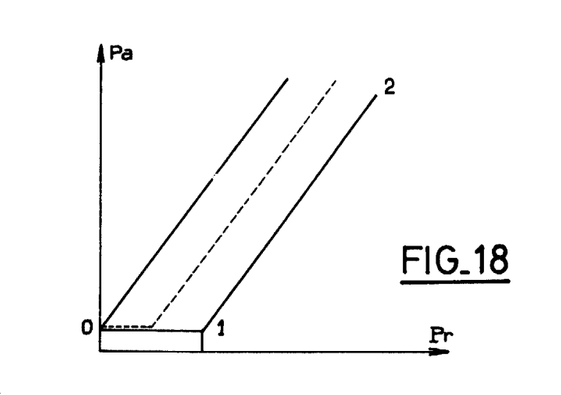
Figure 19:
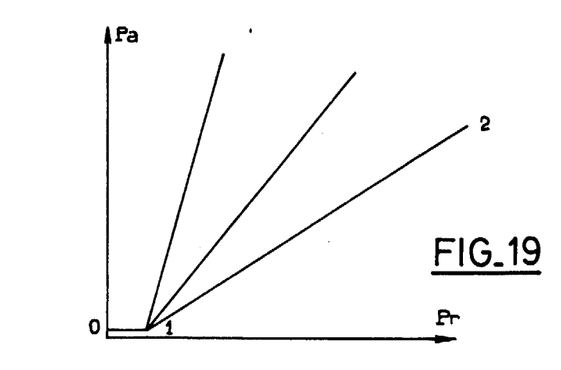
Figure 20:
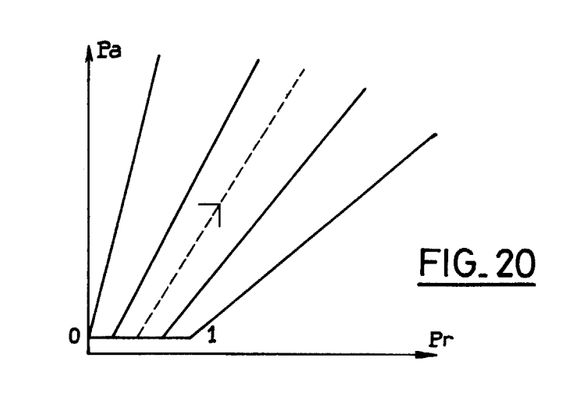
Figure 21:
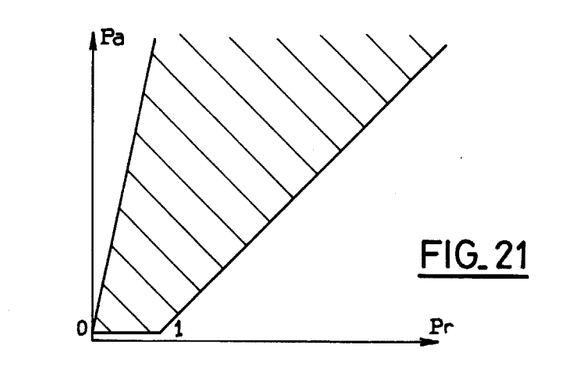

Assuming that the distributor no longer has a spring ensuring reaction in the (third) maneuvering portion of the curve, it is possible to obtain, without modulation of external restrictions, reactions corresponding to portions 0-1-2 of the characteristic curve, as shown on FIGS. 17 and 18. However, restrictions ED and ED' in parallel with restrictions 3 and 3' enable the slope of portion 1-2 to be varied as shown on FIG. 19, which means that, by simultaneously actuating the two external restrictions ED and EV (or EB' and EV'), it is possible to obtain different characteristic curves in compliance with those of FIG. 20. Thus, by adequately adjusting the actions of the external restrictions, any characteristic curve within the shaded area of FIG. 21 can be obtained.

I claim:

1. Hydraulic distributor, more particularly for a vehicle power steering system, including two cooperating elements (20,23) displaceable one relative to the other under the action of a control member (14,21) and defining at least one modulable fluid flow circuit (10,11) establishing communication between a pressurized fluid source (12) and a reservoir (13), said circuit including serially arranged first (1;1'), second (2;2') and third (3;3') valve means simultaneously actuated during a relative displacement between said two elements, the output of said first valve means (1;1') being connectable (15;16) to one end of a hydraulic motor (17) controlled by the distributor, and the output of said second valve means (2;2') being connectable (18;19) to hydraulic means for applying a reaction to said control member and furnishing a characteristic actuating pressure curve of said hydraulic motor torque applied to said control member with a first initial portion (0-1) of zero slope and a following second portion (1-2) with a given slope, characterized in that the distributor comprises, in parallel with said second valve means (2; 2'), fourth modulable valve means (EV,EV') controlled by additional external control means (35;36) so as to selectively modify the position of the transition point between said first and second portions of the characteristic curve.

2. Hydraulic distributor according to claim 1, characterized in that it includes, serially arranged between said first (1;1') and second (2;2') valve means, fifth valve means (4;4') actuated during a relative displacement between said two cooperating elements (20,23) so as to determine the slope of a third portion (2-3) of said characteristic curve as from a determined value of the control torque applied to said control member (14,21) of the distributor.

3. Hydraulic distributor according to claim 2, characterized in that it includes, in parallel with said third valve means (3, 3'), a sixth modulable valve (ED, ED') controlled by additional external control means so as to selectively change the slope of said second portion (1-2) of said characteristic curve.

4. Hydraulic distributor according to claim 2 or 3, wherein said two cooperating elements are respectively comprised of a star-shaped rotor (20) located within a disc-shaped cavity in a stator (23), said rotor being coupled to said control member (21), cooperating edges of recesses (A, A'; C, C'; E; B, B'; D, D') formed in facing surfaces of said rotor and said stator defining restrictions which form said first (1; 1'), second (2; 2') and third (3;3') valve means characterized in that said rotor (20) has reaction arms (27) associated with discharge openings (D, D') of said stator, each said reaction arm separating two reaction chambers (C, C') each delimited at the opposite side by an intermediate arm (50) of said rotor associated with an intermediate passage opening (B, B') of said stator, said fourth modulable valve means (EV, EV') being inserted in a fluid flow circuit (31,32;33,34) interconnecting said reaction chamber (C,C') and the adjacent said intermediate passage opening (B;B').

5. Hydraulic distributor according to claim 4, characterized in that said second valve means (2,2') is formed by a stepped edge (38) of said intermediate arm (50) delimitating said reaction chamber (C;C') and by an adjacent edge of the corresponding said intermediate passage opening (B;B').

6. Hydraulic distributor according to claim 5, characterized in that said fifth valve means (4,4') is formed by a chamfered edge (41,42) of said intermediate arm (50) opposite to said reaction chamber (C,C') and by an adjacent edge of the corresponding said intermediate passage opening (B;B').

7. Hydraulic distributor according to claim 4 characterized in that said third valve means (3;3') is formed by a ramp-shaped edge (39) of said reaction arm (27) and an adjacent edge of said corresponding discharge opening (D,D').

8. Hydraulic distributor according to claim 4 wherein said stator (23) is mounted for limited rotation in a stationary housing (24) and is biased towards a central position by a resilient member (40), characterized in that said stator (23) includes a radial protrusion (26) received with play within a window (25) of said housing (24), and in that said resilient member consists in a C-spring (40) having ends applied against opposite sides of said protrusion (26) and of a centering stop of said housing, said spring supplying a reaction to determine a third portion (2-3) of said characteristic curve corresponding to the highest assistance pressures.

* * * * *